Sept. 6, 1966 R. A. REED ETAL 3,270,861
ARTICLE CONTROL DEVICE FOR ROLLER SLAT CHAIN CONVEYOR
Filed July 31, 1964 2 Sheets-Sheet 1

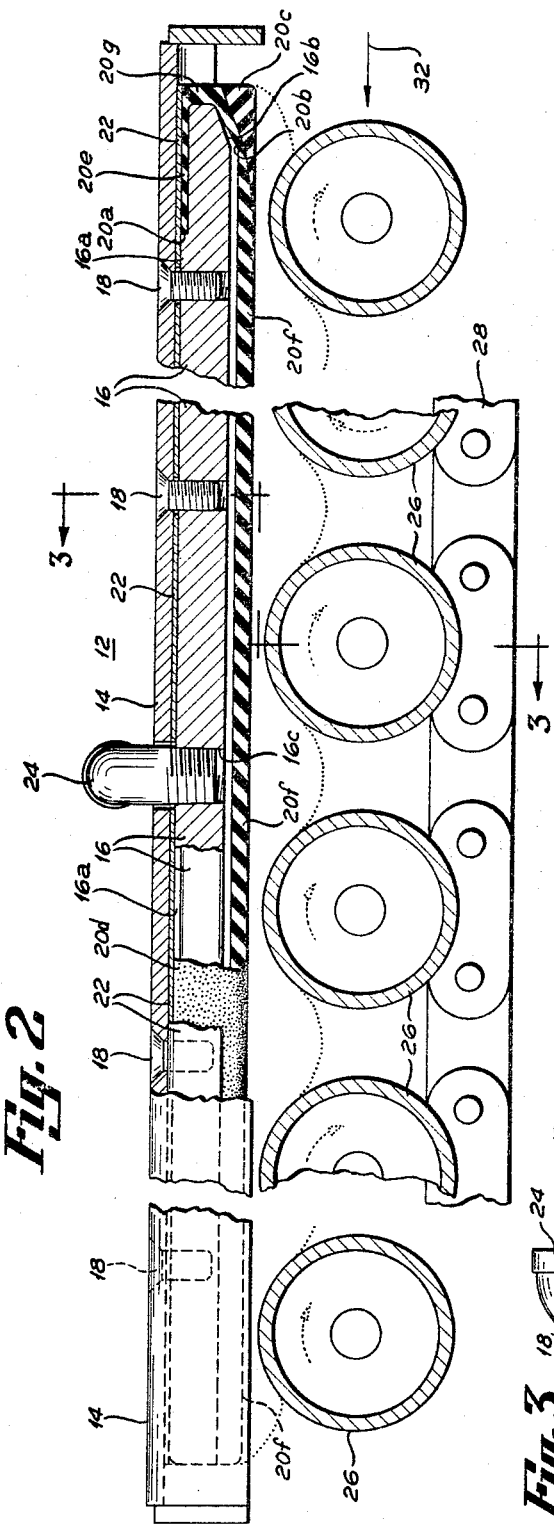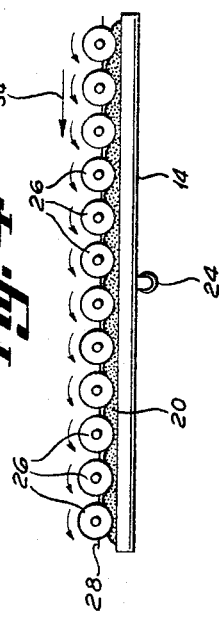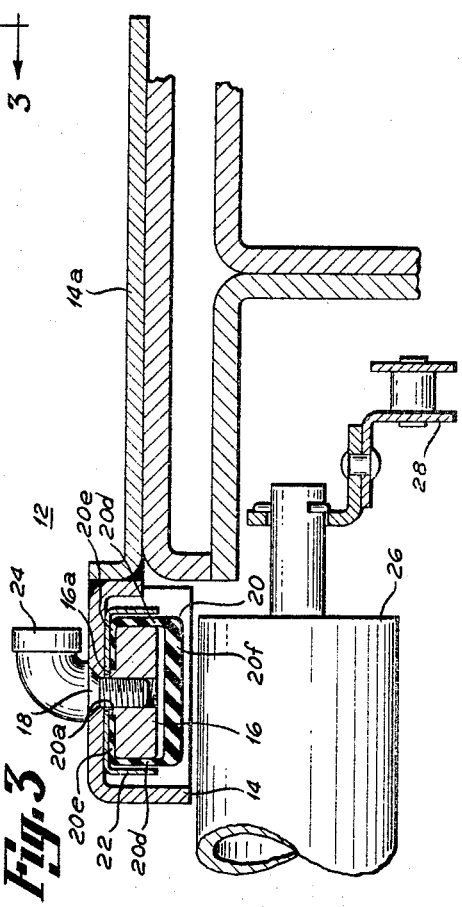

United States Patent Office 3,270,861
Patented Sept. 6, 1966

3,270,861
ARTICLE CONTROL DEVICE FOR ROLLER SLAT CHAIN CONVEYOR
Reginald A. Reed, Menomonee Falls, and Wilton C. Warner, Colgate, Wis., assignors to Cutler-Hammer, Inc., Milwaukee, Wis., a corporation of Delaware
Filed July 31, 1964, Ser. No. 386,533
1 Claim. (Cl. 198—183)

This invention relates to devices for controlling the movement of articles along roller slat chain conveyors. More particularly, this invention relates to those types of devices which either detain an article in a given area of the conveyor for a specified length of time, or which increase the speed of the article in a given area of the conveyor.

These devices are commonly found in newspaper mailrooms where roller slat chain conveyors transport bundles of newspapers from one area to another. The bundles may be stopped, started and sped up at various locations as may be required for the numerous operations preparatory for mailing. The junctions of two or more conveyors also require these devices for traffic control purposes, and it is in this sense that our device is illustrated.

It is accepted practice in devices of this sort to move a member into engagement with the surfaces of the conveyor rollers to cause the rollers to roll along over or under the member as the case may be. Such a member is usually a solid plate having an adherent surface and is mechanically mounted for pivotal or reciprocatory movement. Linkages of this nature require constant maintenance.

It is, therefore, an object of this invention to provide a device for holding or speeding-up an article in travel on a roller slat chain conveyor which has no moving mechanical linkage.

It is another object of this invention to provide an expandable member which moves into and out of engagement with the conveyor rollers.

These and other objects and advantages will appear in the following specification and claim when taken in conjunction with the drawings, in which:

FIG. 2 is a breakaway side elevational view of the device;

FIG. 3 is a sectional view of the device taken generally along line 3—3 in FIG. 2;

FIG. 4 is a schematic representation of another version of the device; and

Figure 1:
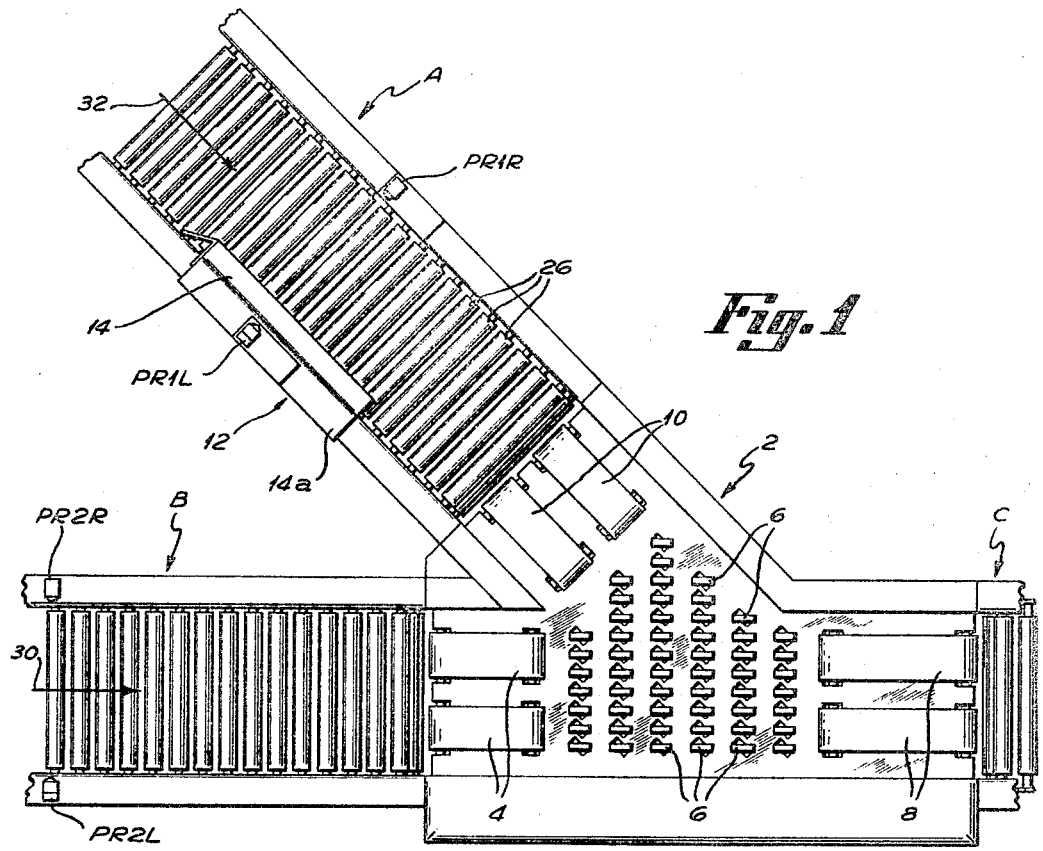
FIGURE 1 is a top plan view of a portion of a conveyor system utilizing the device.

As shown in FIG. 1, a pair of roller slat chain conveyors A and B are connected to a diverting device 2 such as that described and claimed in the George J. Bauch et al. pending application Serial No. 309,119, filed September 16, 1963. Diverting device 2 has a first driven belt type conveyor 4 at one end thereof for receiving bundles from conveyor B and a second driven belt type conveyor 8 at the opposite end for delivering bundles to a takeaway conveyor C. A multiplicity of pivotally mounted driven rollers 6 are located in the central area of diverter 2 to convey the bundles from conveyor 4 to conveyor 8, thereby creating a straight through primary conveyor line from conveyor B to conveyor C.

Conveyor A is connected to diverter 2 at an angle to the primary line and thereby forms a merging, or secondary line. A third driven belt type conveyor 10 is located on an angular extension of diverter 2 and receives the bundles from conveyor A. In response to a signal initiated by a bundle at conveyor 10, each row of driven rollers 6 will rotate a predetermined amount so that the rollers 6 will convey the bundle from conveyor 10 to conveyor 8 in a smooth, graduated curve.

The device embodying the invention is shown in FIG. 1 as a detaining, or brake device 12 located on conveyor A to detain the bundles from approaching the diverter 2 until there is a sufficient interval in the flow of bundles on the main line, or conveyor B. Brake 12 has a box-like frame 14 which is open at the bottom to provide a protective shroud for the device and has a horizontally extending rear leg 14a for mounting the brake to the frame of a conveyor by any suitable fastening means.

A rectangular form member 16 is connected to the frame 14 by a plurality of screws 18. Form member 16 has an upstanding central ridge portion 16a extending lengthwise along its upper surface to points near its ends. A plurality of threaded openings are spaced along the ridge 16a to receive the screws 18. Form 16 also has an upwardly-beveled lower surface 16b at each end thereof as shown in the sectioned end portion of FIG. 2.

A substantially rectangular, resilient, hollow tube 20 having an opening 20a in the top wall thereof which corresponds to ridge portion 16a, is stretched into place over form 16 so that tube 20 envelopes it with only the top surface of ridge portion 16a visible through the opening 20a. The lower surface of tube 20 has an inclined surface 20b at each end thereof as shown in the sectioned end portion of FIG. 2, where it may also be seen that the exterior of these ends have a wedge shaped bumper portion 20c fused thereto. Tube 20 is preferably molded of a soft and flexible rubber, while the bumpers 20c are of a harder rubber. It can also be seen that side walls 20d and top wall 20e are substantially thinner than the bottom 20f and end walls 20g. The thickness of top wall 20e is somewhat greater than the height of ridge portion 16a of form 16 for reasons to be described later.

An elongated U-shaped brace member 22 having clearance holes for screws 18, is inverted and placed over tube 20 and form 16 prior to securing the latter assembly to the frame. As screws 18 are tightened, top wall 20e of tube 20 is compressed between form 16 and the underside of brace 22 until the top surface of ridge 16a butts against the underside of brace 22. This provides a tight seal between tube 20 and form 16.

Figure 5:
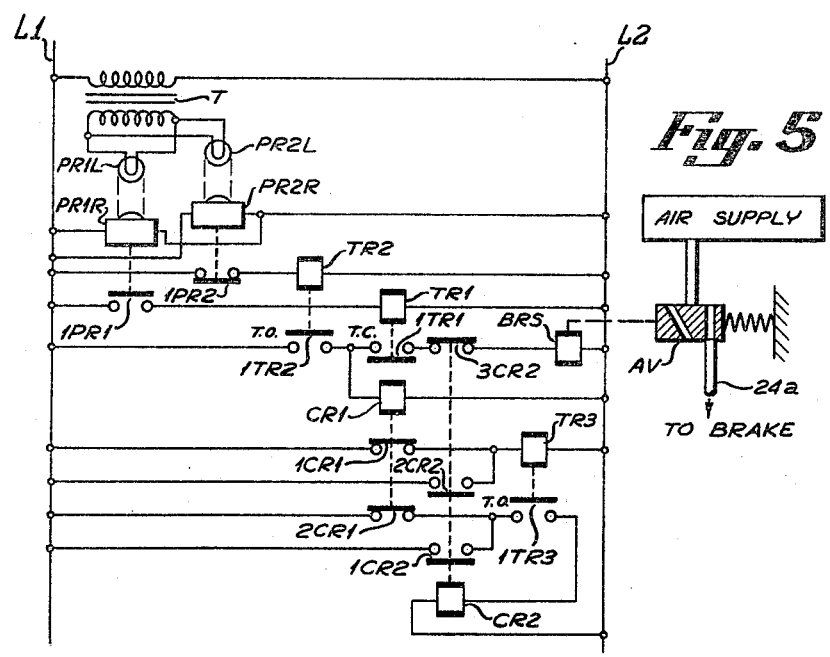
FIG. 5 is a wiring diagram of an exemplary operating circuit for the device.

A fitting 24 is threaded into a tapped opening 16c in form 16 in line with the threaded openings for screws 18 and midway of the ends. Clearance holes are provided in frame 14 and brace 22 for the fitting 24. It can be seen that form 16 does not fill all of the cavity in tube 20 and that a remaining cavity exists as a narrow space between the bottom surface of form 16 and the bottom surface of the cavity in tube 20 in its relaxed position. This space is connected to an air valve AV through fitting 24 and a conduit 24a (FIG. 5). Air valve AV operates under control of a solenoid BRS and alternately directs air into the aforementioned space from a supply source or exhausts the air from this space to the atmosphere to expand or contract the tube 20.

Freely rotatable rollers 26 are carried along a conveyor A by a driven endless link chain 28 at each side of the conveyor. FIG. 3 shows the connection of a roller to the link chain of one side of the conveyor. It can also be seen in FIG. 3 that the brake device 12 is mounted so that the edge of tube 20 and edge of the rollers 26 are in line, or that the edge of the rollers extend slightly beyond the tube 20, so as to give the maximum surface engagement between these members, and yet take up a small portion of the roller width in the conveyor stream. Brake device 12 is also mounted with the frame 14 in close proximity to the rollers 26 to protect rubber tube 20 from foreign objects.

In this application a pair of photo electric relays are used to control brake 12 although suitable limit switches may also be employed. A light unit PR1L and a receiver unit PR1R are mounted on the frame of conveyor A directly opposite each other so that the light beam extends transversely across the conveyor stream. A second light unit PR2L and its receiver PR2R are similarly mounted on conveyor B. The location of these units will of course depend upon conveyor speeds and their distances from diverter 2.

The circuit shown in FIG. 5 is an exemplary circuit to operate the device used in the described application only and is capable of many modifications to operate other versions of the invention. In the diagram, lines L1 and L2 are connectable to a power supply such as two lines of a three phase source, and the circuit is illustrated in this connected, or "power on," state.

A transformer T has its primary winding connected across lines L1 and L2 and its secondary connected in parallel directly across lines L1 and L2. The light beam from light PR1L is received by receiver PR1R to energize the latter and cause its normally closed contact 1PR1 to open. The light beam from light PR2L is received by receiver PR2R to energize the latter which closes its normally open contact 1PR2.

A timer relay TR2 is connected across lines L1 and L2 in series with contact 1PR2 and the closure of the latter renders timer TR2 energized which therefore opens its contact 1TR2. Another timer TR3 is connected across lines L1 and L2 in series with a normally closed contact 1CR1 of a deenergized control relay CR1 which causes the timer to be energized and its contact 1TR3 to be open.

The operating solenoid BRS for air valve AV is connected across lines L1 and L2 in series with contacts 1TR2 of timer TR2, normally open contacts 1TR1 of still another timer TR1, and normally closed contacts 3CR2 of a control relay CR2. The timer TR1 is connected across lines L1 and L2 in series with the open contacts 1PR1 and therefore is deenergized. The solenoid BRS is also deenergized and therefore air valve AV, which is a two position, spring return type, is in its spring return position to exhaust air from the brake to the atmosphere.

As a bundle travels along conveyor B in the direction of arrow 30 (FIG. 1) it breaks the light beam between light PR2L and receiver PR2R. This interrruption deenergizes receiver PR2R and opens the contact 1PR2 which in turn drops out timer TR2 and closes the contacts 1TR2. Closure of these contacts energize control relay CR1 which opens its contacts 1CR1 to drop out timer TR3. Relay CR1 also opens its contacts 2CR1 which are in series with contacts 1TR3 and relay CR2.

As the rear edge of the bundle on conveyor B passes beyond the photo relay and light PR2L once again is received by receiver PR2R, the latter energizes to close its contacts 1PR2 which connect timer TR2 to power to start it timing. It is during the interval in which the contacts 1TR2 are closed and time open that it is undesirable to send a bundle past the brake device 12 on conveyor A. If no bundle breaks the light beam between light PR1L and receiver PR1R on conveyor A during this interval, the timer TR2 will time out and open its contacts 1TR2 which will drop out relay CR1. Relay CR1 in turn will close its contacts 1CR1 and 2CR1. Contacts 1CR1 will then complete a circuit to timer TR3 to start it timing. Contacts 2CR1 will complete a circuit thrtugh the still closed contacts 1TR3 of timer TR3 and the relay CR2 to energize the latter until the contacts 1TR3 time open. Until that time, however, normally closed contacts 3CR2 of relay CR2 is held open to prevent the brake solenoid BRS from being operated for reasons which will become more apparent later.

If, however, a bundle traveling in the direction of arrow 32 (FIGS. 1 and 2) on conveyor A, does break the light beam between light PR1L and receiver PR1R during the interval that timer contacts 1TR2 are closed, the brake device 12 is applied. In this situation, the receiver PR1R is deenergized and its contacts 1PR1 close to energize the timer TR1 and start it timing. The contacts 1TR1 of timer TR1 will time closed after a very short interval with respect to the interval of time needed to open the contacts 1TR2 of timer TR2. The timer interval of timer TR1 allows the bundle on conveyor A to reach the position in which it is directly over the area in which the brake is applied to the rollers. Upon closure of contacts 1TR1 a circuit is completed through the still closed contacts 1TR2 of timer TR2, contacts 1TR1, contacts 3CR2 of deenergized relay CR2 and the solenoid BRS to energize the latter. Solenoid BRS then pushes the valve AV to the right as viewed in FIG. 5 to connect the air supply with the aforementioned cavity between form 16 and the tube 20 to expand the latter. Tube 20 expands virtually straight away toward the rollers as indicated by the broken line in FIG. 2. This is accomplished by the thinner side walls 20d of the tube, which offer more elasticity, and the legs of brace 22 which restrict the horizontal displacement of the walls 20d. The rollers, moving in the direction of arrow 32, strike against the harder bumper portion 20c and then roll along under the inflated tube as indicated by the dotted arrows on the rollers. The resiliency of tube 20 allows it to closely conform to the shape of the rollers and thus engage more roller surface for better gripping characteristics. A bundle on top of the rollers in the area of this brake will remain in place due to the reverse spin of the passing rollers.

Timer TR2 times out after a time interval which is of sufficient length to allow the bundle on conveyor B to arrive at a point in which the approaching bundle on conveyor A will not interfere. The contacts 1TR2 open to drop out the solenoid BRS which releases the valve AV. The valve is spring returned to its left-hand position as viewed in FIG. 5 and the air from within the tube 20 is exhausted to the atmosphere through fitting 24, conduit 24a and the valve AV. Thus the brake returns to its normal position and the bundle may continue along conveyor A.

The opening of contacts 1TR2 also drops out relay CR1 which in turn closes its contacts 1CR1 and 2CR1. Contacts 1CR1 complete a circuit to timer TR3 to start it timing while contacts 2CR1 complete a circuit to relay CR2 to energize it. Relay CR2 closes its contacts 1CR2 and 2CR2 to maintain circuits to itself and timer TR3, respectively, and opens its contacts 3CR2 in line with solenoid BRS. These contact operations on relay CR2 allow a bundle to be clear of the area of the brake device before the system responds to another bundle on conveyor B which may or may not have already reset timer TR2. Timer TR3 is set for a time interval of sufficient length to allow the aforementioned bundle to clear the device, at which time it times out and opens its contact 1TR3 to drop out CR2 and the system is restored.

FIG. 4 schematically shows another use of the invention wherein the device is mounted under a roller slat chain conveyor. The rollers travel above the device on a chain in the direction of arrow 34. Upon inflation of the tube 20, the rollers roll over the tube in a forward spin, thus increasing the speed of an article being conveyed in this area.

It is understood that the invention described herein is not limited to the described versions, and that it is susceptible of numerous variations without departing from the scope of the appended claim.

We claim:

The combination with a roller slat chain conveyor having its rollers individually rotatable about their longitudinal axes, of a device comprising an elongated, resilient member secured to a rigid form member to create a closed cavity therebetween, and means connecting said cavity to a fluid source to selectively effect a change in the volume of said cavity to cause said resilient member to assume an expanded position wherein it directly frictionally engages and closely conforms to the arcuate surfaces of said rollers to effect rotation thereof when they pass thereacross, and said resilient member being disengaged from said rollers in its unexpanded position.

References Cited by the Examiner
UNITED STATES PATENTS

| | | | |
|---|---|---|---|
| 2,710,087 | 6/1955 | Picard | 188—152.86 |
| 2,828,027 | 3/1958 | Stevenson et al. | 214—38.20 X |
| 2,959,273 | 11/1960 | Sykes | 198—183 |
| 2,973,073 | 2/1961 | Elliott | 193—38 |
| 2,979,177 | 4/1961 | Sullivan | 193—40 |
| 3,040,872 | 6/1962 | Hohl | 198—127 |

EVON C. BLUNK, *Primary Examiner*.

SAMUEL F. COLEMAN, *Examiner*.

R. M. WALKER, *Assistant Examiner*.